(12) United States Patent
Tsuji

(10) Patent No.: US 8,322,240 B2
(45) Date of Patent: Dec. 4, 2012

(54) HYDRAULIC PUMP DEVICE FOR WORK VEHICLE

(75) Inventor: Kenichiro Tsuji, Ashiya (JP)

(73) Assignee: Kubota Corporation, Osaka (JP)

( * ) Notice: Subject to any disclaimer, the term of this patent is extended or adjusted under 35 U.S.C. 154(b) by 73 days.

(21) Appl. No.: 12/551,006

(22) Filed: Aug. 31, 2009

(65) Prior Publication Data
US 2010/0331131 A1  Dec. 30, 2010

(30) Foreign Application Priority Data

Jun. 29, 2009 (JP) ................................. 2009-153722

(51) Int. Cl.
*F16H 37/00* (2006.01)

(52) U.S. Cl. .......................................... 74/11; 74/15.86

(58) Field of Classification Search ............. 74/11, 15.4, 74/15.8, 15.82, 15.86, 15.88; 29/893.1
See application file for complete search history.

(56) References Cited

U.S. PATENT DOCUMENTS

| | | | | | |
|---|---|---|---|---|---|
| 1,243,720 A * | 10/1917 | Eidson et al. | ................. | 475/223 |
| 1,389,167 A * | 8/1921 | Shuster et al. | ................. | 74/15.4 |
| 1,449,572 A * | 3/1923 | Zuhars et al. | ................ | 74/15.86 |
| 1,520,562 A * | 12/1924 | Crawford | ..................... | 74/15.88 |
| 1,644,765 A * | 10/1927 | Wilson | ........................ | 74/15.69 |
| 1,691,346 A * | 11/1928 | Gorbutt | ........................... | 74/370 |
| 1,900,415 A * | 3/1933 | Fullerton | ..................... | 74/15.88 |
| 2,302,515 A * | 11/1942 | Ball et al. | ..................... | 180/53.1 |
| 2,459,092 A * | 1/1949 | Peterson et al. | ............. | 74/15.86 |
| 2,743,615 A * | 5/1956 | Keese | .......................... | 74/15.63 |
| 2,924,995 A * | 2/1960 | Hubert et al. | ................... | 74/745 |
| 2,945,382 A * | 7/1960 | Kaspar et al. | .................. | 74/15.8 |
| 3,527,032 A * | 9/1970 | Wood | ................................... | 56/6 |
| 3,546,951 A * | 12/1970 | Van Ausdall | ................ | 74/15.86 |
| 3,910,126 A * | 10/1975 | Felder | ............................. | 74/11 |
| 3,982,599 A * | 9/1976 | Herscovici et al. | .......... | 180/53.1 |
| 4,587,862 A * | 5/1986 | Hoffman | ..................... | 74/15.88 |
| 4,722,235 A * | 2/1988 | Kumazawa | .................. | 74/15.66 |
| 4,856,355 A * | 8/1989 | Ishimaru | .......................... | 74/11 |
| 5,195,402 A * | 3/1993 | McMillen et al. | ....... | 74/665 GC |
| 5,697,264 A * | 12/1997 | Andrews et al. | ......... | 74/665 GB |
| 6,821,225 B2 * | 11/2004 | Ishii | ................................ | 475/74 |
| 6,988,580 B2 * | 1/2006 | Ohashi et al. | ................. | 180/307 |
| 7,204,779 B2 * | 4/2007 | Irikura et al. | ................. | 475/230 |
| 7,673,712 B2 * | 3/2010 | Iida et al. | ..................... | 180/53.1 |
| 8,196,399 B1 * | 6/2012 | Hauser et al. | .................. | 60/435 |
| 2004/0216539 A1 * | 11/2004 | Ishii et al. | ..................... | 74/15.69 |
| 2008/0148883 A1 * | 6/2008 | Prampolini | .................. | 74/15.86 |
| 2009/0223312 A1 * | 9/2009 | Yamaguchi | ....................... | 74/11 |
| 2009/0301429 A1 * | 12/2009 | Takashina et al. | ......... | 123/197.5 |

FOREIGN PATENT DOCUMENTS

JP            200690476          4/2006

* cited by examiner

*Primary Examiner* — Justin Krause
*Assistant Examiner* — Adam D Rogers
(74) *Attorney, Agent, or Firm* — The Webb Law Firm

(57) ABSTRACT

A hydraulic pump device for a work vehicle having a transmission case that houses a PTO shaft (12) comprises: a hydraulic pump (35), a pump input shaft (36) of the hydraulic pump (35) that has a projecting shaft portion projecting into the transmission case (1), a first bevel gear (41), and a second bevel gear (42). The first bevel gear (41) is fitted on the PTO shaft (12) and the second bevel gear (42) is connected to the projecting shaft portion. A holder (38) for supporting the PTO shaft (12) is removably attached to the transmission case (1). The first bevel gear and the second bevel gear are supported to the holder for rotation about respective axes.

14 Claims, 3 Drawing Sheets

HYDRAULIC PUMP DEVICE FOR WORK VEHICLE

BACKGROUND OF THE INVENTION

1. Field of the Invention

The present invention relates to a hydraulic pump device for a work vehicle having a transmission case that houses a PTO axis.

2. Description of the Related Art

Some of the hydraulic pump devices for work vehicles, such as tractors include a hydraulic pump having its pump input shaft projected into a transmission case, a first bevel gear fitted onto a PTO axis, a second bevel gear which meshes with the first bevel gear and is connected with the pump input shaft of the hydraulic pump with the first and the second bevel gears provided within the transmission case. The rotational power of the PTO axis is taken out by the first and second bevel gears to rotate the pump input shaft of the hydraulic pump. An example of the hydraulic pump device for work vehicles of this conventional type is disclosed in JP Publication Of Application No. 2006-90476. In this device, a tubular support shaft projecting to the first bevel gear and a support shaft projecting to the second bevel gear are supported separately by a respective holder for rotation about an axis of rotation and a holder supporting the first bevel gear is different from a holder supporting the second bevel gear.

SUMMARY OF THE INVENTION

Since the bearing case for supporting the first bevel gear is different from the holder supporting the second bevel gear in the conventional device, adjusting the positions of the first and second bevel gears for proper meshing takes time and efforts, and assembling the first and second bevel gears into the transmission case was also troublesome.

An object of the present invention is to provide a hydraulic pump device which allows easy adjustment of the positions of the first and second bevel gears for proper meshing, and which also facilitates assembly of the first and second bevel gears into the transmission case.

To achieve the objective described above, a hydraulic pump device, in accordance with the present invention, for a work vehicle having a transmission case that houses a PTO axis comprises: a hydraulic pump; a pump input shaft of the hydraulic pump, the pump input shaft having a projecting shaft portion projecting into the transmission case; a first bevel gear, and a second bevel gear that meshes with the first bevel gear, the first and second bevel gears being housed within the transmission case, the first bevel gear being fitted onto the PTO shaft, and the second bevel gear being coupled with the projecting shaft portion of the pump input shaft; a holder for supporting the PTO shaft, the holder being removably attached to the transmission case. The first bevel gear and the second bevel gear are supported to the holder for rotation about respective axes.

In accordance with the present invention, since a holder for supporting the PTO shaft is removably attached to the transmission case and since the first and second bevel gears are supported to this holder for rotation about their respective axes, adjustment of the positions of the first and second bevel gears for proper meshing may be performed easily. In addition, if the holder is attached to the inside of the rear end of the front transmission case of the transmission case, the assembly of the first and second bevel gears to the transmission case would be facilitated.

Other feature and advantages of the present invention will be clear from the description of the preferred embodiment of the present invention with reference to the attached drawings.

DETAILED DESCRIPTION OF THE PREFERRED EMBODIMENTS

The preferred embodiment of the present invention is described next with reference to the attached drawings.

Figure 1:
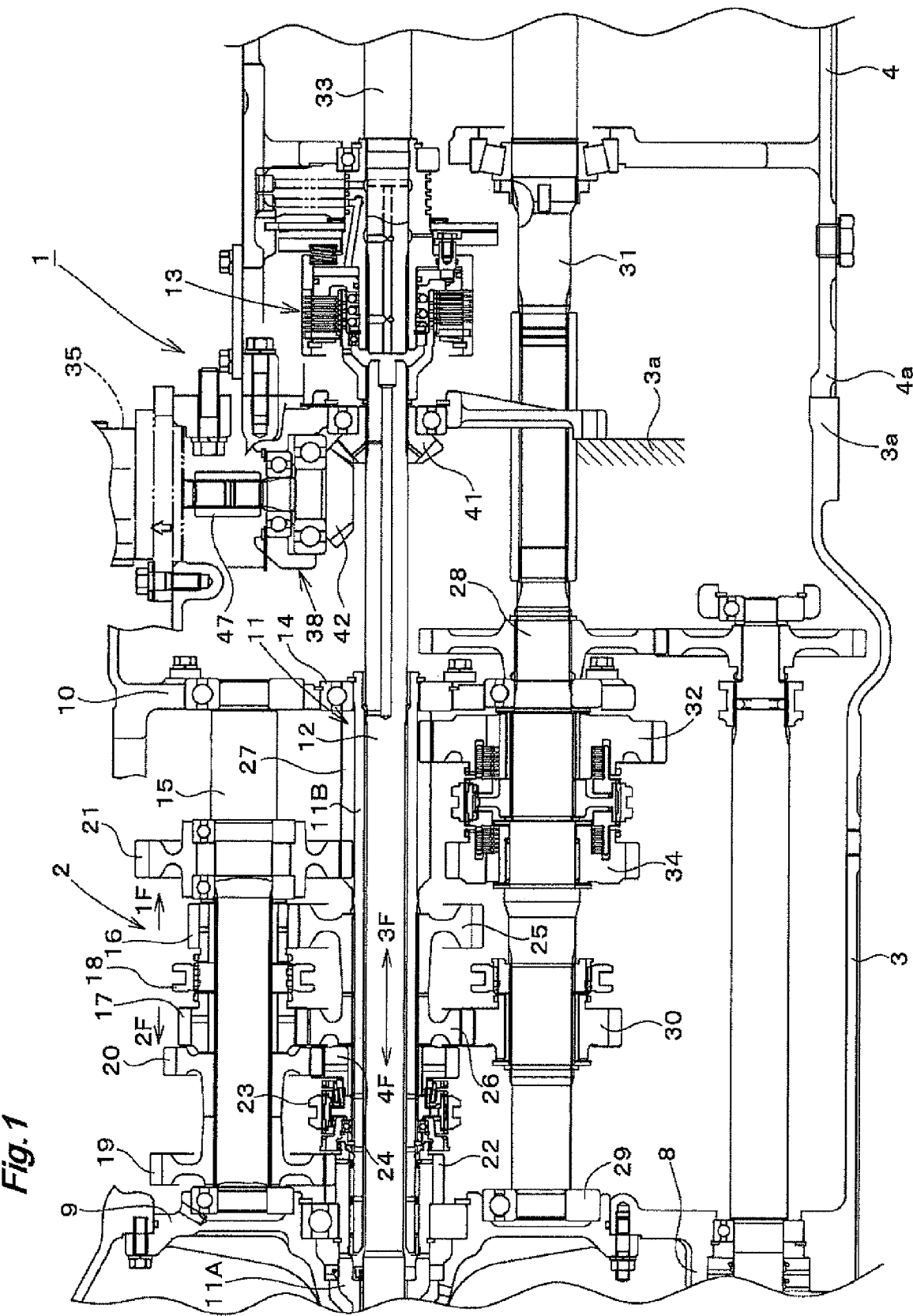
FIG. 1 is a side sectional view of a work vehicle according to one embodiment of the present invention and partially includes a rear sectional view.

As shown in FIG. 1, the tractor vehicle body has a transmission case 1, whose main components are a front transmission case 3 which houses a gear type main speed change portion 2, and a rear transmission case 4 in the rear which houses, among other things, a rear-wheel differential, and a PTO speed change portion. The rear edge 3a of the front transmission case 3 and the leading edge or the front edge portion 4a of the rear transmission case 4 are joined in the fore-and-aft direction.

A clutch housing 8 is provided forwardly of and is connected to the front transmission case 3, and this housing 8 is connected to a rear surface of an engine.

Engine power is engaged and disengaged by the clutch and transmitted to a driving axis 11 the travel drive line, and the driving axis 11 has a tubular shaft structure and is divided into a front axis 11A and a rear axis 11B. The PTO axis 12 is inserted within the driving axis 11 and is coupled to the PTO speed change portion through the PTO clutch 13.

The travel drive line driving axis 11 is installed to the support holder 9 and the intermediate wall 10 of the front transmission case 3 by a bearing 14, etc., and the speed change countershaft 15 is installed to the support holder 9 and the intermediate wall 10 by a bearing, in parallel with the axis 11.

In the present embodiment, the gear-type main speed change portion 2 is always in engagement, and is provided between the driving axis 11 and the speed change countershaft 15.

In more detail, the main speed change portion 2 includes a first shifter 18 which is located between and adapted to engage with either of the first and second driving speed change gears 16, 17 which are freely rotatably supported to an approximately central portion of the speed change countershaft 15, a transmission gear 19 and a third driving speed change gear 20 both located in a forward region of the speed change countershaft 15, and a reverse rotation gear 21 rotatably provided in the rear region of the speed change countershaft 15.

A drive gear 22 which engages with the transmission gear 19 on the countershaft 15 is provided on the front shaft 11A of the travel drive line driving axis 11. A second shifter 23 is provided which directly links the gear 22 and the rear axis 11B when moved in the direction shown by the arrow 4F to provide a fourth speed position or gear ratio. This second shifter 23 enables the driven third speed change gear 24 to selectably engage with the third driving speed change gear 20 to provide a third speed position or gear ratio when moved in the arrow shown at 3F.

Further, first and second driven speed change gears 25 and 26, which engage the first and second driving speed change gears 16 and 17, are fixedly mounted to the rear axis 11B in the driving axis 11, and a wide transmission gear 27 which engages the reverse rotation gear 21 is also provided on the axis 11. First and second speeds or gear ratios are obtained by shifting the first shifter 18 in the directions indicated by 1F and 2F respectively.

A speed change output shaft 28 is installed to the front transmission case 3 through a bearing 29 and is parallel to the travel drive line driving axis 11 and the speed change countershaft 15. A high-speed auxiliary speed change gear 30, a low-speed auxiliary speed change gear 32, and the reverse rotation gear 34 are provided to the speed change output shaft 28 and are operatively connected to the rear-wheel differential through the power transmission shaft 31.

The rear-wheel differential is operatively connected to the rear wheels through a final reduction gear, and a front-wheel differential is operatively connected to the front wheels through the final reduction gear to provide a four-wheel-drive tractor.

The PTO axis 12 transmits engine power to the PTO power transmission shaft 33 through a PTO clutch 13. The PTO power transmission shaft 33 is configured to transmit power to the PTO axis in the rear of the rear transmission case 4 through a PTO speed change mechanism.

The PTO axis 12 and the PTO power transmission shaft 33 are arranged to meet end-to-end in a rear region of the front transmission case 3, or a front region of the rear transmission case 4. Each of the PTO axis 12 and the PTO power transmission shaft 33 is supported for independent rotation by bearings in the rear of the front transmission case 3, or the front of the rear transmission case 4.

The pump power take off structure is described next. The structure is attached to the transmission case 1 as hydraulic pressure supply means for power steering for the tractor and also as hydraulic pressure supply means for supplying hydraulic pressure to the three-point link hitch mechanism installed in the tractor rear.

Figure 2:
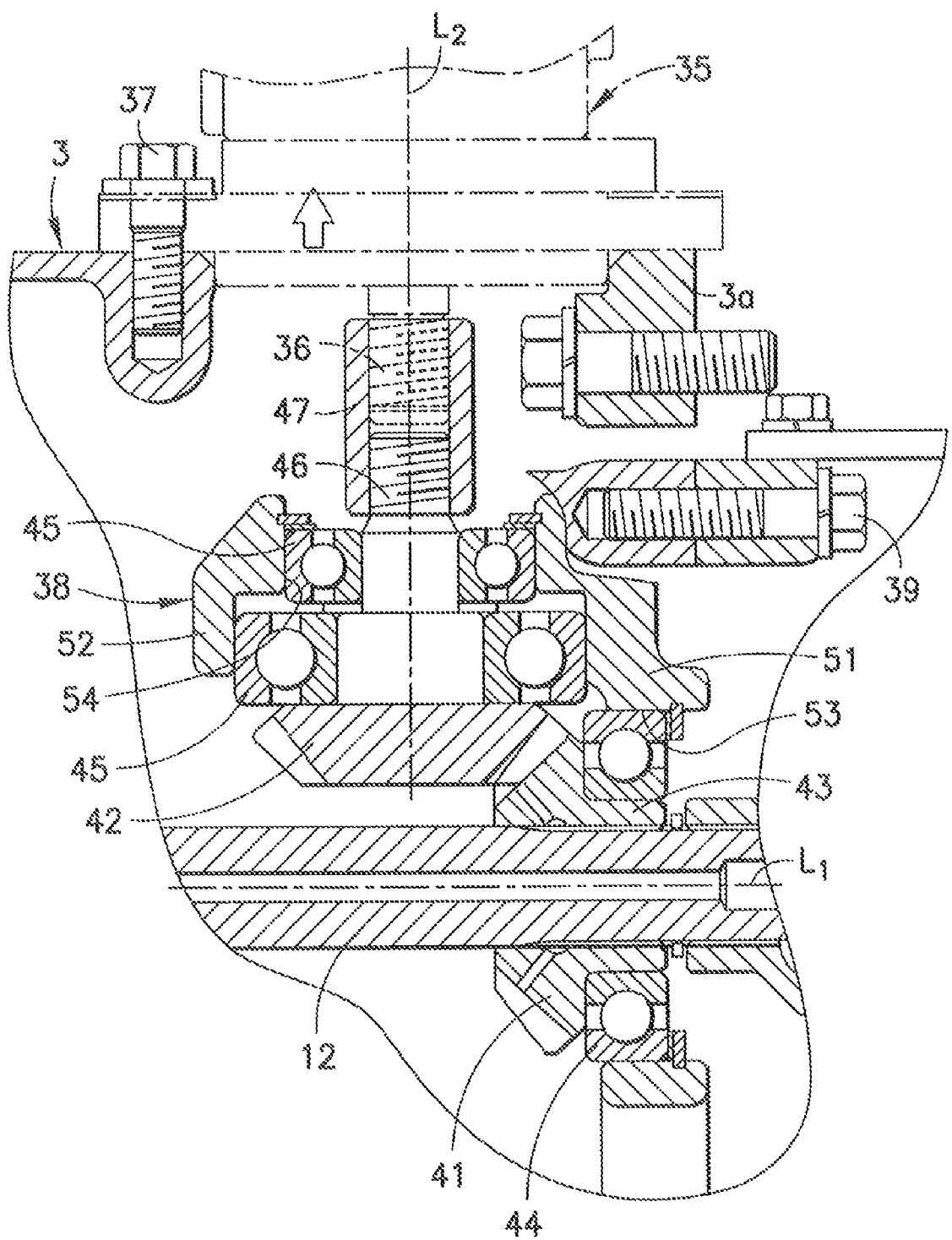
FIG. 2 is a detail view of a pump attaching portion of FIG. 1.
Figure 3:
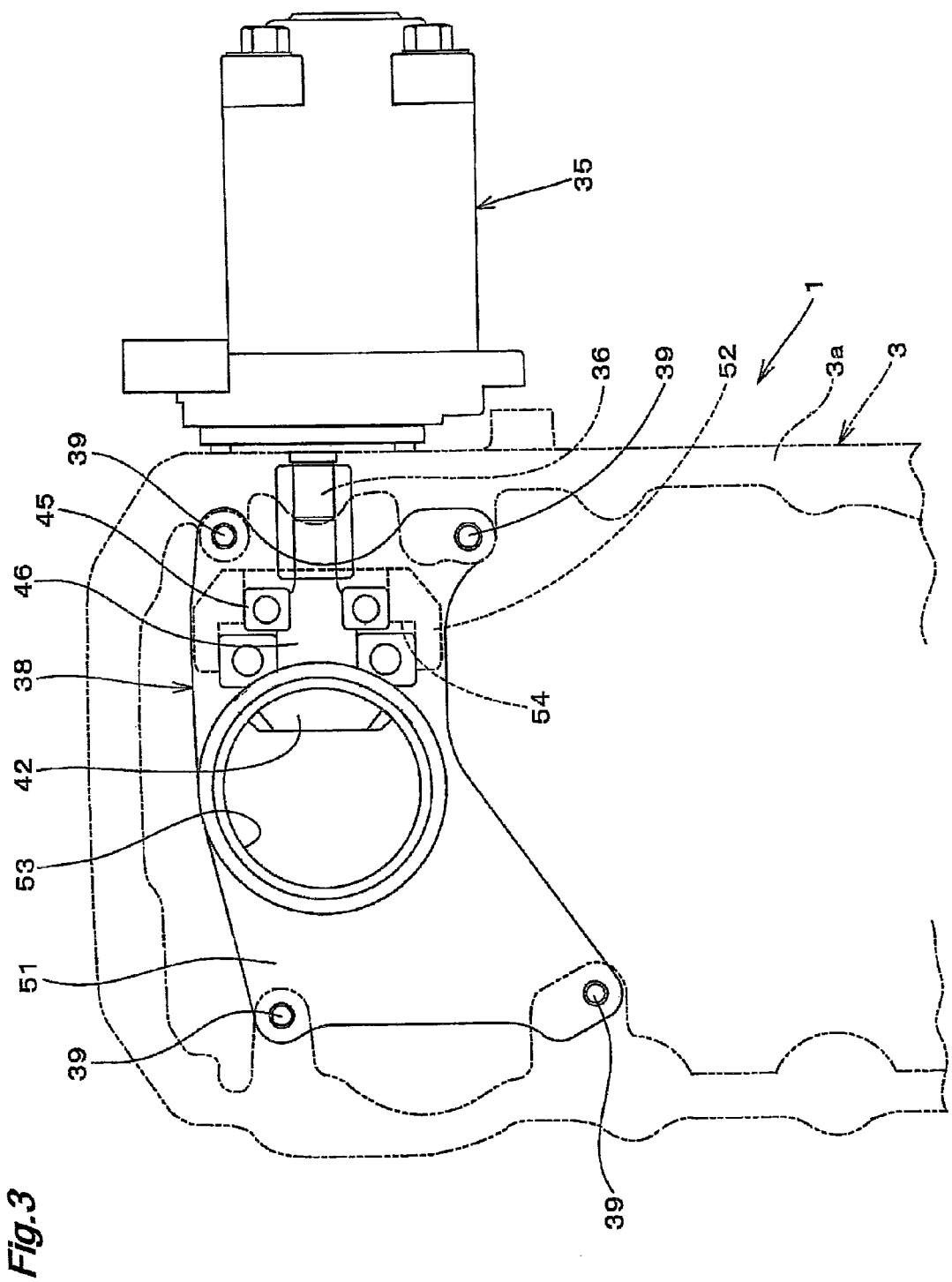
FIG. 3 is a rear sectional view of the pump attaching portion.

As shown in FIGS. 2 and 3, the hydraulic pump 35 is removably attached to a right hand side surface in the rear of the front transmission case 3 with one or more tightening tools 37, such as bolts. The hydraulic pump 35 projects outwardly from the rear of the front transmission case 3, and its pump input shaft 36 projects into within the rear portion of the front transmission case 3.

A holder 38 which supports the back end portion of the PTO axis 12 is provided in the rear of the front transmission case 3, and the holder 38 is removably attached to an attachment boss of a rear edge 3a of the front transmission case 3 by one or more tightening tools 39, such as bolts, so that the holder is attached to inside the rear or back end of the front transmission case 3.

A first bevel gear 41, having a rotation axis L1, is fitted on the back end portion of the PTO axis 12 and a second bevel gear 42 having a rotation axis L2 is connected to the pump input shaft 36 of the hydraulic pump 35 are provided within the rear of the front transmission case 3, and the second bevel gear 42 meshes with the first bevel gear 41. The first bevel gear 41 is arranged rearwardly of the second bevel gear 42, and the first bevel gear 41 has a tubular support shaft 43 projected in the direction of its axis, and the tubular support shaft 43 is spline-fit to the back end portion of the PTO axis 12, so that the rotation axis L1 of the first bevel gear 41 is coaxial with the PTO axis 12 and rotates with the PTO axis 12. The second bevel gear 42 has a support shaft 46 projected in the direction of its axis. A support shaft 46 and the pump input shaft 36 of the 2nd bevel gear 42 are fixedly connected by a coupling 47, so that the support shaft 46 rotates with the pump input shaft 36 in unison about the same rotation axis L2.

The holder 38 has a first support portion 51 and a second support portion 52 in the shape of an L, and a first attachment hole 53 is provided in the first support portion 51, and a second attachment hole 54 is provided in the second support portion 52. The back end portion of the PTO axis 12 and the support tubular shaft 43 of the first bevel gear 41 are inserted into the first attachment hole 53 of the first support portion 51 in the fore-and-aft direction, and are rotatably supported by the holder 38 through the bearing 44. Thereby, the first bevel gear 41 and the back end portion of the PTO axis 12 are rotatably supported by the holder 38 for rotation about its axis, so that the back end portion of the PTO axis 12 is supported by the transmission case 1 through the first bevel gear 41 and the holder 38. The support shaft 46 of the second bevel gear 42 is laterally inserted into or through the attachment hole 54 of the second support portion 52, and is rotatably supported by the holder 38 through the bearing 45.

According to the embodiment described above, after assembling the PTO axis 12, the speed change output shaft 28, the countershaft 15, each speed change gear, etc. all of which are located forwardly of the intermediate wall 10 of the front transmission case 3, into the front transmission case 3; and with the first bevel gear 41 and the second bevel gear 42 assembled to the holder 38 for rotation about their axes, the holder 38 in the assembled state is then inserted into the front transmission case 3 from the upper or side direction (or any direction in-between) of the front transmission case 3, and is attached to the rear edge 3a of the front transmission case 3 by one or more tightening tools 39, such as bolts, whereby the assembled holder 38 is non-rotationally secured to the transmission case 3. Then, by inserting into the support tubular shaft 43 of the first bevel gear 41, the PTO axis 12 is spline-fit to the support tubular shaft 43 of the first bevel gear 41. And, by inserting the pump input shaft 36 of the hydraulic pump 35 into the front transmission case 3, the support shaft 46 of the second bevel gear 42 and the pump input shaft 36 can be fixedly connected by coupling 47. The hydraulic pump 35 can then be fixed to the front transmission case 3 by one or more tightening tools 37, such as the bolts tightened from outside.

Accordingly, since the first bevel gear 41 and the second bevel gear 42 are rotatably supported by one holder 38 for rotation about their axes, they can be assembled together before installing them to the transmission case 1, and thus the positions of the bevel gears for proper meshing may be adjusted easily.

What is claimed is:

1. A hydraulic pump device for a work vehicle having a transmission case that houses a power take off shaft, the hydraulic pump device comprising:
   a hydraulic pump, the hydraulic pump arranged outside of the transmission case;
   a pump input shaft of the hydraulic pump, the pump input shaft having a projecting shaft portion projecting into the transmission case;
   a pump power take off unit that is removably fixed inside of the transmission case, including:
      a holder having a first support portion and a second support portion, the first support portion defining a first attachment hole having a first hole axis, the second support portion defining a second attachment hole having a second hole axis perpendicular to the first hole axis;
      a first bevel gear, the first bevel gear having a first support shaft supported by the first support portion through a first bearing, the first support shaft being transmitted power from the power take off shaft; and
      a second bevel gear, the second bevel gear having a second support shaft supported by the second support portion through a second bearing, the second support shaft transmitting power to the projecting shaft portion;
   wherein the first bevel gear and the second bevel gear mesh with each other;
   wherein a plurality of fasteners fix the pump power take off unit to the transmission case;
   wherein the first bevel gear and the second bevel gear are supported to the holder for rotation about their respective rotation axes;
   wherein the first bevel gear, the second bevel gear, and the holder are installed into the transmission case as an assembled unit;
   wherein the first bevel gear, the second bevel gear, and the holder as the assembled unit being removably fixed to the transmission case;
   wherein the first support portion extends across the power take off shaft, the first support portion having a proximal end portion defined adjacent the hydraulic pump with respect to the first attachment hole and a distal end portion defined remote from the hydraulic pump with respect to the first attachment hole, and the proximal end portion and the distal end portion having respective holes defined therein for the fasteners; and wherein the second support portion extends laterally from the first support portion along the power take off shaft.

2. A hydraulic pump device as defined in claim 1, wherein the first bevel gear fits into a width of the first support portion in the side view about the power take off shaft.

3. A hydraulic pump device as defined in claim 1, wherein the first support shaft is formed as a tube shaft that is splined to the power take off shaft.

4. A hydraulic pump device for a work vehicle having a transmission case that houses a power take off shaft, the hydraulic pump device comprising:

a hydraulic pump;

a pump input shaft of the hydraulic pump, the pump input shaft having a projecting shaft portion projecting into the transmission case;

a first bevel gear, and a second bevel gear that meshes with the first bevel gear, the first and second bevel gears being housed within the transmission case, the first bevel gear being fitted onto the power take off shaft, wherein an axis of rotation of the first bevel gear is coaxial with an axis of rotation of the power take off shaft and the first bevel gear rotates with the power take off shaft, and wherein the second bevel gear is coupled with the projecting shaft portion of the pump input shaft, and wherein an axis of rotation of the second bevel gear is coaxial with an axis of rotation of the pump input shaft and the second bevel gear rotates with the pump input shaft;

a holder for supporting the power take off shaft, the holder being removably fixed to the transmission case as a non-rotational member;

wherein the first bevel gear and the second bevel gear are supported to the holder for rotation about their respective rotation axes, such that the first bevel gear, the second bevel gear, and the holder are installed into the transmission case as an assembled unit and attached to the transmission case; and wherein the holder has a first support portion defining a first attachment hole supporting a first bearing to support the first bevel gear and has a second support portion defining a second attachment hole supporting a second bearing to support the second bevel gear, and wherein the first support portion extends parallel to the pump input shaft and from the second support portion extends parallel to the power take off shaft so that the first support portion supports the first bearing at a position below and adjacent the second bearing.

5. A hydraulic pump device as defined in claim 4, wherein the first bevel gear is positioned rearwardly of the second bevel gear and near a rear end of the power take off shaft, and the first bevel gear has a tubular support shaft that projects in an axial direction, the tubular support shaft is spline-fit to a rear end of the power take off shaft and is supported by the holder, and wherein the second bevel gear has a support shaft that projects in an axial direction, the support shaft is connected to the projecting shaft portion for a rotation therewith about a same axis and is supported by the holder.

6. A hydraulic pump device as defined in claim 5, wherein the holder is attached to an inside of a rear end of a front transmission case which forms a part of the transmission case.

7. A hydraulic pump device as defined in claim 4, wherein the holder is attached to an inside of a rear end of a front transmission case which forms a part of the transmission case.

8. A hydraulic pump device as defined in claim 4, wherein the second support portion further provides fixed portions, the fixed portions being removably fixed to the transmission case.

9. A hydraulic pump device as defined in claim 4, wherein the assembled unit is attached to the transmission case with at least one fastener.

10. A hydraulic pump device for a work vehicle having a transmission case that houses a power take off shaft, the hydraulic pump device comprising:

a hydraulic pump;

a first bevel gear and a second bevel gear that meshes with the first bevel gear, the first bevel gear fitted onto the power take off shaft to be coaxially-arranged with an axis of the power take off shaft and integrally-rotating with the power take off shaft, and the second bevel gear coupled with a pump input shaft to be coaxially-arranged with an axis of the pump input shaft and integrally-rotating with the pump input shaft;

a holder for supporting the power take off shaft, the holder fixed to the transmission case as a non-rotational member;

wherein the hydraulic pump is removably fixed to an outer wall of the transmission case, and the pump input shaft has a projecting shaft portion projecting into the transmission case, the second bevel gear connected to the projecting shaft portion; and wherein the holder rotatably supports the first bevel gear and the second bevel gear about respective axes, such that the first bevel gear, the second bevel gear, and the holder are installed into the transmission case as an assembled unit and attached to the transmission case, and the assembled unit is removably fixed to the transmission case.

11. A hydraulic pump device as defined in claim 10, wherein the holder is fixed to the transmission case in the state supporting the first bevel gear and the second bevel gear about respective axes and the first bevel gear is fitted onto the power take off shaft.

12. A hydraulic pump device as defined in claim 10, wherein the holder has a first support portion elongated toward a radial direction of the power take off shaft and a second support portion elongated from the first support portion toward an axial direction of the power take off shaft, wherein the first support portion provides a first attachment hole, the first attachment hole rotatably supports the first bevel gear through a bearing, and wherein the second support portion provides a second attachment hole and fixed portions, and the second attachment hole rotatably supports the second bevel gear through a bearing, the fixed portions being removably fixed to the transmission case.

13. A hydraulic pump device as defined in claim 10, wherein the first bevel gear has a tubular support shaft that projects in an axial direction, the tubular support shaft being spline-fit to an end of the power take off shaft and is supported by the holder, and wherein the second bevel gear has a support shaft that projects in an axial direction, and the support shaft is connected to the projecting shaft portion for a rotation therewith about a same axis and is supported by the holder.

14. A hydraulic pump device as defined in claim 10, wherein the assembled unit is attached to the transmission case with at least one fastener.

* * * * *

UNITED STATES PATENT AND TRADEMARK OFFICE
CERTIFICATE OF CORRECTION

| | |
|---|---|
| PATENT NO. | : 8,322,240 B2 |
| APPLICATION NO. | : 12/551006 |
| DATED | : December 4, 2012 |
| INVENTOR(S) | : Kenichiro Tsuji |

It is certified that error appears in the above-identified patent and that said Letters Patent is hereby corrected as shown below:

Column 5, Line 47, Claim 4, after "and" delete "from"

Signed and Sealed this
Twelfth Day of February, 2013

Teresa Stanek Rea
*Acting Director of the United States Patent and Trademark Office*